INVENTOR.
JOSEPH D. WOOD
BY Ostrolenk, Faber, Gerb & Soffen
ATTORNEYS.

MULTIPLE BREAK AIR MAGNETIC BREAKER

Filed April 29, 1958 8 Sheets-Sheet 2

INVENTOR.
JOSEPH D. WOOD
BY Ostrolenk, Faber, Gerb & Soffen
ATTORNEYS

INVENTOR.
JOSEPH D. WOOD
BY Ostrolenk, Faber, Gerb & Soffen
ATTORNEYS

Dec. 8, 1959 J. D. WOOD 2,916,588

MULTIPLE BREAK AIR MAGNETIC BREAKER

Filed April 29, 1958 8 Sheets-Sheet 4

INVENTOR.
JOSEPH D. WOOD

BY Ostrolenk, Faber, Gerb & Soffen

ATTORNEYS

MULTIPLE BREAK AIR MAGNETIC BREAKER

INVENTOR.
JOSEPH D. WOOD
BY Ostrolenk, Faber, Gerb & Soffen
ATTORNEYS

MULTIPLE BREAK AIR MAGNETIC BREAKER

Filed April 29, 1958 8 Sheets-Sheet 6

INVENTOR.
JOSEPH D. WOOD
BY Ostrolenk, Faber, Gerb & Soffen
ATTORNEYS

Dec. 8, 1959 J. D. WOOD 2,916,588

MULTIPLE BREAK AIR MAGNETIC BREAKER

Filed April 29, 1958 8 Sheets-Sheet 7

INVENTOR.
JOSEPH D. WOOD

BY Ostrolenk, Faber, Gerb & Soffen
ATTORNEYS

MULTIPLE BREAK AIR MAGNETIC BREAKER

Filed April 29, 1958 8 Sheets-Sheet 8

INVENTOR.
JOSEPH D. WOOD

BY Ostrolenk, Faber, Gerb & Soffen
ATTORNEYS

United States Patent Office

2,916,588

Patented Dec. 8, 1959

2,916,588

MULTIPLE BREAK AIR MAGNETIC BREAKER

Joseph D. Wood, Wayne, Pa., assignor to I-T-E Circuit Breaker Company, Philadelphia, Pa., a corporation of Pennsylvania

Application April 29, 1958, Serial No. 731,769

13 Claims. (Cl. 200—145)

This application relates to circuit breakers in general, and more particularly to air magnetic circuit breakers wherein a plurality of breaks are established in sequence to accomplish arc interruption which is facilitated by the insertion of a low impedance resistor in series with each of the breaks but the initial break to be established.

At the instant of final arc extinction in a circuit breaker, a race begins between the rate of increase of dielectric strength in the space between the cooperating contacts and the rate of rise of recovery voltage. All breakers in general, and air magnetic breakers in particular, are not capable of causing the dielectric strength to become infinite instantaneously but experience a residual conductivity and a corresponding post arc current in the space between the contacts. The existence of this residual conductivity is in reality an aid to circuit interruption, since it acts to minimize the severity of over-voltages. Both oil and air blast circuit breakers are capable of rapid and energetic deionization to a point where over-voltages of abnormally high amplitude and frequency reappear at the terminals of the breaker. Air magnetic circuit breakers experience a rather high residual conductivity and post arc current, the result of which is the removal of over-voltages and a damping of the high frequency components. This post conductive condition has the effect of an externally connected shunting resistor.

If abnormally high voltages are detrimental to insulation, circuit breakers of the oil and air blast type which are capable of energetic deionization can be used on the condition that they are equipped with shunt resistances whose function is to counteract the lack of residual conductivity and to reduce the oscillations from the transient component of recovery voltage. When used in this capacity, the resistor should at least critically damp the transient at the full breaker rating and, for breakers in the 69 kv. class and up, should have resistances of a few hundred ohms only. The value of the critical resistance, capable of critically damping, may be approximated to be:

$$R=\tfrac{1}{2}\sqrt{L/C}=\pi f L$$

Values of resistance below the critical value successfully remove high frequencies and are easier to insert but circuit breakers employing this system must be equipped with a second auxiliary break capable of interrupting the current passed by the resistor.

Resistors are also used to prevent voltage buildup due to restriking when interrupting capacitance currents. The value of resistance depends on the capacitance of the system and has been estimated by several authors to be in the neighborhood of twice the synchronous 60 cycle reactance of the capacitor bank being switched.

In an air magnetic circuit breaker the space between the contacts is inherently slow to deionize and is in general not subjected to high frequency transient voltages. The degree of ionization and the associated deionizing time are a function of the magnitude of the current being interrupted. Therefore, it may be said that interruption can be made easier by either reducing the voltage across the contact space which has been contaminated by the arc or by reducing the current magnitude and the associated degree of ionization. Both of these methods can be accomplished by the employment of resistors either in series to reduce the magnitude of current, or in parallel with several series contacts to act as potential dividers in reducing the voltage per contact.

The selection of a resistor to reduce current and increase power factor in an air magnetic circuit breaker will be influenced by the interrupting capabilities of the first interrupter which must sustain the greatest current and associated arc energy since its function will be to shunt the current to a new path, through the resistor.

I have found that higher capacity and high voltage air magnetic circuit breakers can be built by utilizing multiple breaks formed in sequence and by inserting current limiting resistors in parallel with all breaks but the last to be formed. The presence of the resistor assists arc interruption in that the last break is formed of a reduced current at a high power factor.

Each break is established in an individual arc chute or an individual section of a large arc chute. It is believed that large arc chutes do not operate as efficiently as small ones due to the greater difficulties in uniformly driving the arc into the chute and obtaining a uniform voltage distribution.

This application discloses two methods whereby the resistor may be inserted. The first is referred to as arc insertion wherein the resistor is introduced in much the same manner as a blowout coil. In this method an arc is drawn between the parting cooperating contacts and driven into the rear portion of the arc chute. The resistor is connected between the rear arc runner and an intermediate runner. By the time the crown of the movable contact arm passes beneath the intermediate runner, the current path through the resistor is of a lower impedance than the arc path between the cooperating contacts so that current now flows through the resistor and the first arc is extinguished. However, a second arc is drawn in the front portion of the arc chute between the intermediate runner and movable contact with the current of the second arc being limited by the resistor. The second arc is lengthened and cooled until it is extinguished.

The second method is referred to as sequence contact wherein a second contact and a separate arc chute, or a separate portion of the arc chute in which the initial arc is established, are used to interrupt the resistor current thus leaving the main contacts and primary portion of the arc chute free to transfer the short circuit current into the resistor. This method may utilize a circuit breaker wherein the time between the parting of the final arcing contact and the sequence contact are adjusted so that the resistor carrying the transferred short circuit current will sustain this current for the shortest possible time. The latter method is especially useful in capacitor switching since upon closing, the initial connection between the capacitor bank and power source is through the resistor while upon opening, the shunting effect reduces high voltage transients.

Low resistance values are desirable in that high voltage transients are reduced while the current to be interrupted by the last break remains relatively high. On the other hand, increasing the value of resistance assists interruption by decreasing the current and improving the power factor for the last break.

My invention also contemplates the utilization of separate blowout coils to act on each portion of the arc. In this case the coils are energized in sequence upon the formation of the arc sections to be interrupted thereby. The number of turns in each successive coil to be energized is increased so that the magnetic force exerted by the coil remains high even though the current value of each successive arc portion is less than the current of the previous arc portion. In this way even the last arc portion to be formed will be driven deeply into the arc chute to assure arc interruption and prevent restrike.

Further, the current limiting resistors hereinabove mentioned may be incorporated into the blowout coils positioned to act upon the current limited portions of the arc. That is, these blowout coils may be wound of Nichrome or some other highly resistive conductor which can readily be bent. The conductors are wound and then molded into a heat resistant material, such as a ceramic or a mica compound. The molding provides turn-to-turn and interlayer insulation as well as acting as an absorber of the heat given off by the resistance wire. The coils may be wound of relatively fine gauge wire since they will be called upon to carry current for only a short period.

By building the resistance into the coil conductors, a considerable overall saving of space in the circuit breaker assembly is achieved.

Accordingly, the primary object of the instant invention is to provide a novel air magnetic circuit breaker wherein arc interruption is effected by the formation in sequence of a plurality of breaks.

Another object is to provide an air magnetic circuit breaker wherein resistance is utilized to shunt all but the last one of the multi-breaks in the arc path.

Still another object is to provide a circuit breaker utilizing an arc insertion method to insert resistance in parallel with a portion of the arc drawn between the cooperating contacts and in series with the remainder of the arc.

A further object is to provide a circuit breaker utilizing a sequence contact means to insert resistance in the arc circuit.

A still further object is to provide an air magnetic breaker wherein the arc is established by a plurality of breaks formed in sequence, with each break having a separate arc chute, or an individual portion of a single arc chute, associated therewith, so that each portion of the arc is confronted by a portion of the arc chute which is uncontaminated by arcing products.

Another object is to provide an air magnetic breaker wherein the arc is established in successive portions and in which separate blowout coils are utilized to act upon the different arc portions with the coils being inserted as their associated arc portions are established.

Still another object is to provide the blowout coils acting on a given portion of the arc with a greater number of turns than the blowout coils acting on the preceding portion of the arc.

Yet another object is to wind a blowout coil of high resistance wire thereby eliminating the necessity of a separate current limiting resistor.

These as well as other objects of the instant invention will become apparent after reading the following description of the accompanying drawings, in which.

Figure 1:
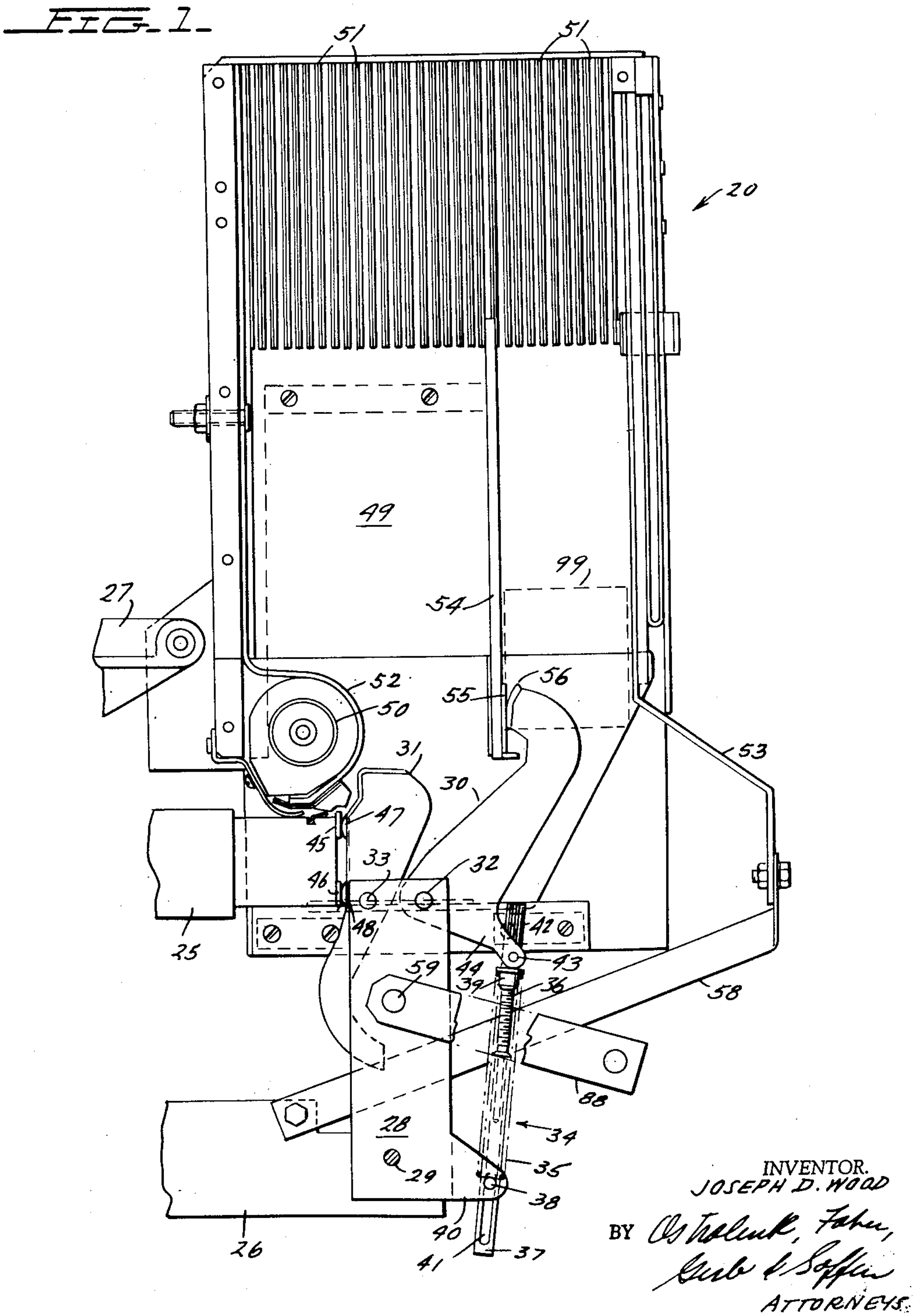
Figure 1 is a side elevation of a sequence contact interrupter built in accordance with the principles of the instant invention, with the interrupter in its closed position.

Referring more particularly to Figures 1 to 6, circuit interrupter 20 illustrated therein operates on a sequence contact principle and is particularly useful in switching a capacitor bank 21 into and out of a circuit in parallel with a load 22. Circuit interrupter 23 is connected in series with load 22 and the parallel combination of capacitor bank 21 and load 22 is connected across the terminals of A.C. generator 24 or another capacitor bank (not shown).

Sequence contact interrupter 20 includes an upper 25 and a lower 26 current carrying stud, each of which are mounted to, and insulated from, frame 27 in a manner well known to the art. Contact arm 28 is pivotally mounted to lower stud 26 at pin 29. First 30 and second 31 contact members are pivotally mounted at pins 32 and 33, respectively, to contact arm 28 in electrical contact therewith.

Operatively connected between contact arm 28 and first contact member 30 is a biasing means 34 which is effective to bias first contact member 30 counterclockwise for certain positions (Figures 1 and 2) of contact arm 28 while for other positions (Figure 3) thereof biasing means 34 is ineffective. Biasing means 34 comprises a coil spring 35 and stud 36 having external threads which are mated with the internal threads of stud 37. Studs 36, 37, when joined, form a guideway for coil spring 35 which is positioned thereabout. One end of spring 35 abuts pin 38 while the other end abuts collar 39 of stud 36.

Pin 38 is carried by a rearward extension 40 of contact arm 28 and is received by elongated slot 41 of stud 37. Stud 36 has its free end 42 serrated so as to facilitate rotation of stud 36 while adjusting the length of the spring guideway. Pin 43 is carried by stud 36 at its serrated end 42 and is received by an opening in an extension 44 of first contact member 30 to form a pivotal connection between biasing means 34 and first contact member 30.

Thus, when pin 38 is positioned at the top of slot 41, spring 35 is in a loaded condition and first contact member 30 is strongly biased in a counterclockwise direction about pin 32 but is in its least counterclockwise position with respect to contact arm 28. When pin 38 is positioned at the bottom of slot 41, spring 35 is loaded to a lesser degree than when pin 38 is positioned at the top of slot 41 and first contact member 28 is in its most counterclockwise position with respect to contact arm 28.

Upper current carrying stud 25 has mounted thereon stationary arcing contact 45 and stationary main contact 46 which are operatively positioned to cooperate with movable arcing 47 and movable main contacts 48, both carried by second contact member 31. Positioned above the portion of sequence contact interrupter 20 hereinbefore described is an arc chute 49 generally of the type described in Patent Nos. 2,390,735; 2,311,690; 2,348,228;

2,311,701; 2,375,328; and 2,338,715, comprising a plurality of spaced parallel arc extinguishing plates 51.

At an intermediate point between the rear 52 and front 53 arc runners is a mid-runner 54 extending parallel to plates 51. Stationary contact 55 is secured to mid-runner 54 near its lower end where it is positioned for engagement by movable contact 56 carried by the first contact member 30. As illustrated in Figure 4, resistor 57 is electrically connected directly between rear arc runner 52 and mid-runner 54 to shunt the rear portion of arc chute 49.

Figure 4A:
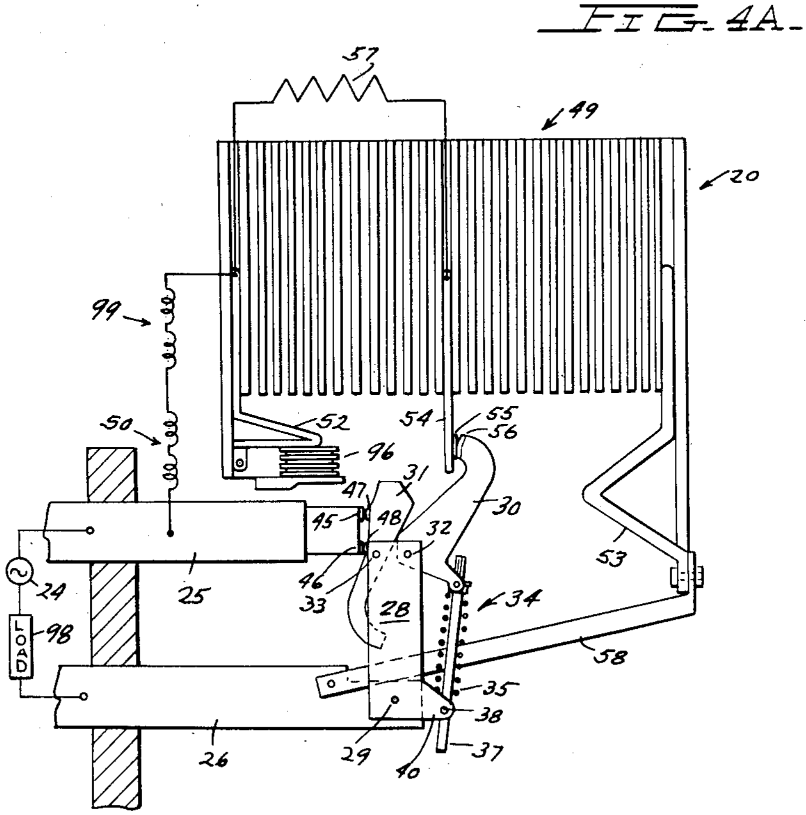
Figures 4A and 4B are schematic representations of two different circuit arrangements for the sequence contact interrupter of Figures 1–3.

With resistor 57 and coils 50 and 99 connected as in Figure 4A, movement of the circuit breaker mechanism from the closed position (Figure 1) toward the intermediate position (Figure 2) initially results in an arc being drawn directly between the parting contacts. The arc current is soon transferred by the parallel plate jump gap 96 to flow through coils 50 and 99 to rear runner 52, thereafter resuming the arc. Blowout coils 50, 99 may be connected in bucking relationship to create a uniform flux density across arc chute 49 in a manner fully described in my U.S. Patent 2,831,946 entitled "Closed Magnetic Coil Blowout with Series Coils."

In the fully closed position of Figure 1, a complete current path exists between upper and lower current carrying studs 25 and 26 respectively. This path comprises current carrying stud 25, stationary main contact 46, movable main contact 48, second contact member 31, contact arm 28, and lower current carrying stud 26.

Figures 2, 3:
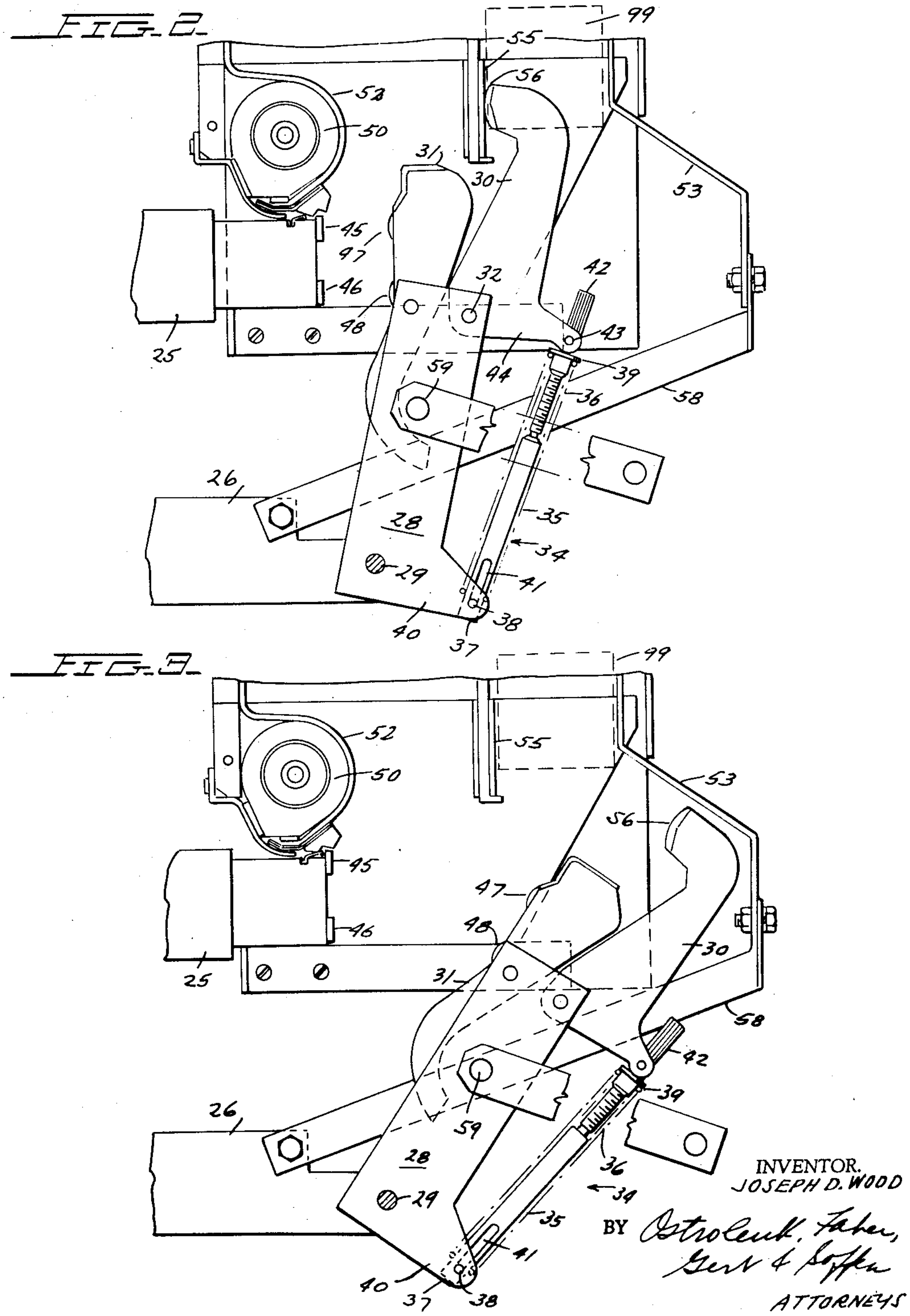
Figures 2 and 3 are fragmentary views of the circuit interrupter of Figure 1 showing the contacts thereof in the intermediate and fully opened positions respectively.

Sequence contact interrupter 20 is operated from its closed position of Figure 1 to the intermediate position of Figure 2 by a clockwise rotation of contact arm 28 about pin 29. Motion is imparted to contact arm 28 by means of a suitable actuating mechanism, such as a toggle linkage which is well known to the art, acting through link 88 secured to contact arm 28 at pin 59.

In the intermediate position of Figure 2, after the arc in the rear portion of chute 49 has been extinguished, the current path between upper and lower current carrying studs 25, 26 respectively comprises blowout coils 50 and 99, resistor 57, mid-runner 54, first contact member 30 and contact arm 28. At this time stationary arcing and main contacts 45, 46 are disengaged from movable arc and main contacts 47, 48 respectively. Thus any load current passing through sequence interrupter contact 20 at this time is limited by the value of resistor 57.

In the intermediate position of Figure 2 the clockwise movement imparted to contact arm 28, while rotating second contact member 31 clockwise a sufficient distance to disengage the arcing and main contacts, has not caused a sufficient movement of contact member 30 to disengage contacts 55, 56. All that has come about is a clockwise rotation of pin 32 with respect to pin 29. Since spring 35 is loaded it strongly urges first contact member 30 counter-clockwise about pin 32 so that contact 56, carried by first contact member 30, remains in engagement with stationary contact 55, secured to mid-runner 54.

Further clockwise rotation of contact arm 28 will move sequence contact interrupter 20 to its open position of Figure 3. In this position, the path between upper and lower current carrying stud 25, 26 now includes a large air gap between stationary arcing and main contacts 45, 46 and movable arc and main contacts 47, 48 as well as a large air gap between stationary contact 55 and movable contact 56.

With sequence contact interrupter 20 connected in a circuit as in Figure 5 the opening operation proceeds in the following manner. Initial clockwise movement of contact arm 28 will cause main contacts 46, 48 to part. Thereafter, arcing contacts 45, 47 will part drawing an arc therebetween. Further separation of arcing contacts 45, 47 will cause the arc current to be transferred through blow-out coils 50 and 99 which is now in series between an arc drawn between rear arc runner 52 and second contact member 31. This arc is forced upward into the rear section of arc chute 49 where the plates thereof cause the arc to follow a torturous path thereby partially deionizing and tending to extinguish the arc.

Further clockwise movement of contact arm 28 causes contact 56 to separate from contact 55 drawing an arc therebetween. At this time the arc in the rear section of arc chute 49 is paralleled by resistor 57. Since the portion of the arc in the rear portion of arc chute 49 has been lengthened and deionizing to a great degree resistor 57 offers a lower impedance current path than the only slightly ionized air gap between rear arc runner 52 and mid-runner 54. Therefore, the arc in the rear portion of arc chute 49 will be transferred to resistor 57 which will now be in series with the arc drawn between contacts 55 and 56. It is to be noted that the arc in the rear portion of chute 49 has usually been extinguished before the separation of contacts 55 and 56 takes place.

Resistor 57 serves to limit the magnitude of the current in the arc between contacts 55, 56, yet resistor 57 is of a sufficiently low value to prevent excessive voltage transients from originating. The arc between contacts 55, 56 grows longer as these contacts continue to part and the length of the arc is further increased by the effect of the field created by blow-out coils 50 and 99 acting in conjunction with the arc plates 51 in the front section of arc chute 49. At some point before contact arm 28 reaches its most clockwise position, the arc will be transferred from contact 56 to front arc runner 53. At this time a current path exists from upper current carrying stud 25, through blowout coil 50, resistor 57, mid-runner 54, the electric arc, front arc runner 53, conducting strap 58 and lower current carrying stud 26.

In operating sequence contact interrupter 20 from the open position (Figure 3) to the closed position (Figure 1) when interrupter 20 is utilized to switch a discharged capacitor bank 21, the circuit is first completed through resistor 57 as contacts 55, 56 engage (Figure 2). Thus the peak charging current for capacitor bank 21 is limited by the value of resistor 57. When interrupter 20 reaches its closed position of Figure 1, resistor 57 is shunted out of the circuit by second contact member 31.

Figure 4B:
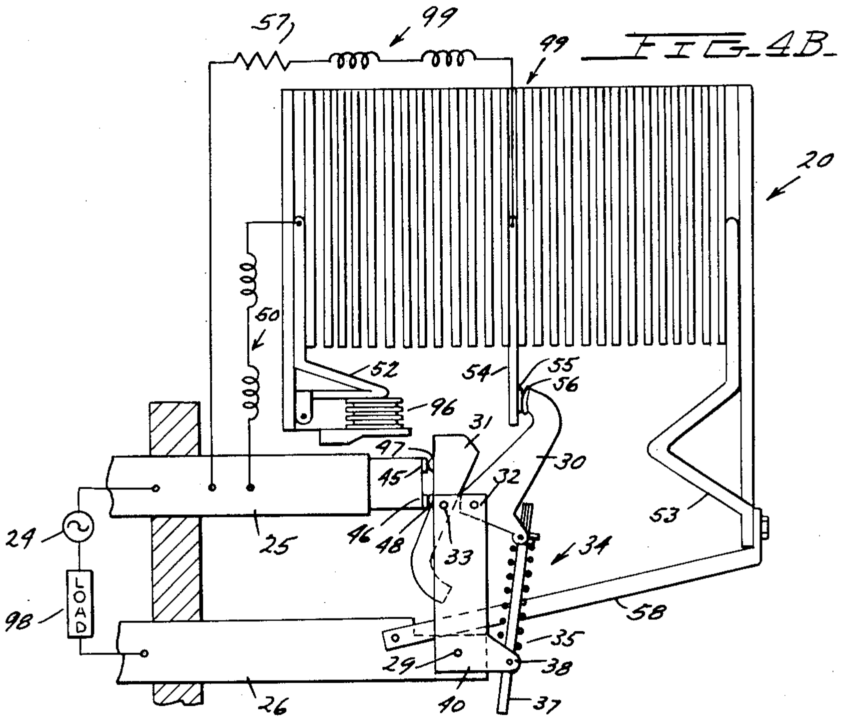

Figure 4B illustrates an alternate circuit arrangement for blowout coils 50 and 99. In this arrangement only one set of coils is energized at a time and the coil 99 at the front portion of arc chute 49 is constructed of many more turns than the coil 50 at the rear portion of the chute 49. By increasing the turns in the front blowout coil 99, the portion of the arc in the front of arc chute 49 is subjected to a substantial magnetic field even though the arc current is limited by the resistor 57. In this dual magnetic circuit construction, both coils 50, 99 may be extended so that their magnetic fields will extend beyond the mid-runner thereby eliminating the possibility of opposing fields existing at the mid runner.

With this arrangement, since blowout coils 99 carry current for a short time interval, resistor 57 may be formed as part of coils 99. That is, resistor 57 may be comprised of the resistance of the conductors forming coils 99. These conductors may consist of Nichrome or other highly resistive metal alloy.

Figure 5:
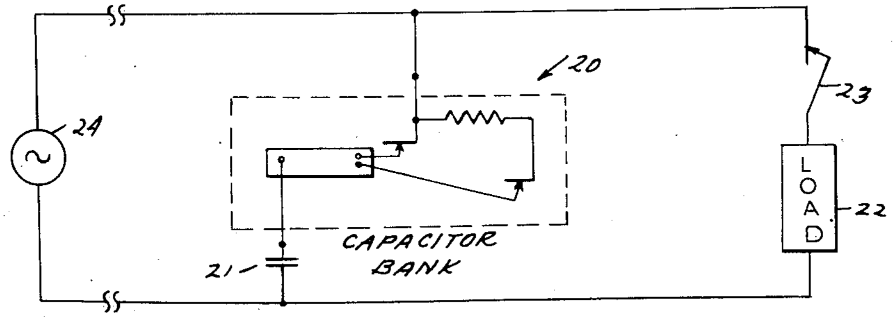
Figure 5 is a schematic illustrating the manner in which the sequence contact interrupter is utilized for capacitor switching.

With the circuit arrangement of Figure 5, movement of the circuit breaker mechanism from the closed position (Figure 1) toward the intermediate position (Figure 2) will cause the arc current in the rear portion of chute 49 to flow through coils 50 but not through coils 99. When the arc in the rear portion has been extinguished, the arc current will flow through the series connection of resistor 57 and coils 99 which limit the current of the last portion of the arc and improve the power factor thereof.

For applications not requiring the insertion of a current limiting resistor on closing, the first contact member 30 may be eliminated. Without member 30 and its movable contact 56, the arc drawn between the rear arc runner 52 and second contact member 31, after spanning a predetermined gap length, will be transferred from contact member 31 to mid-runner 54. Shortly after the transfer the arc in the rear portion of arc chute 49 will be extinguished and thereafter the arc current in the front portion of chute 49 will flow through resistor 57, thus limiting the arc current so that the arc may be readily extinguished.

Figure 6:
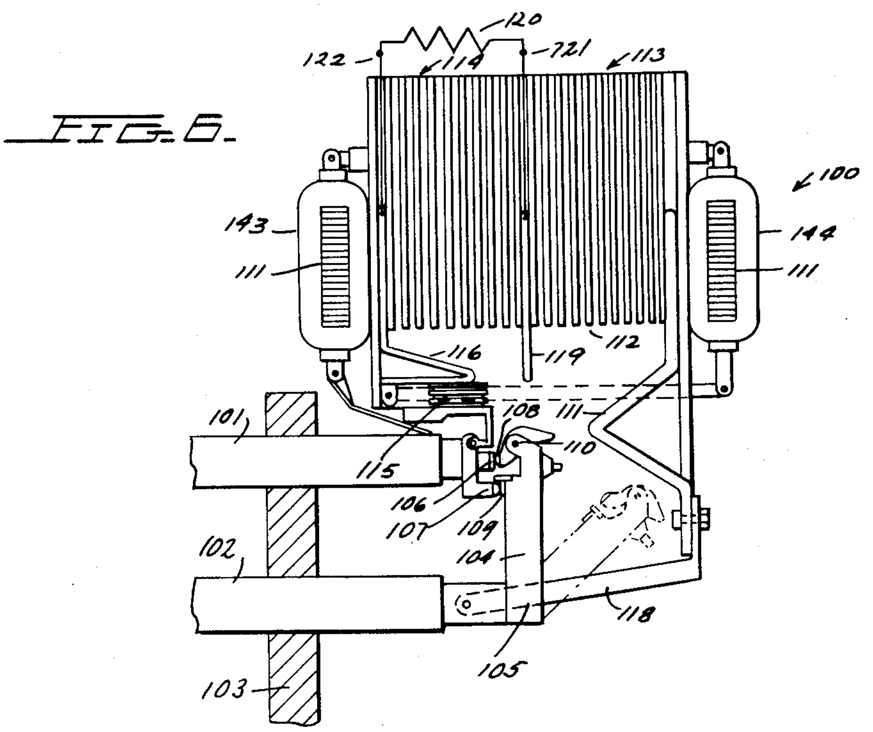
Figure 6 is a schematic illustration of an arc insertion type circuit interrupter wherein the arc is divided into two portions.

A circuit interrupter 100 constructed in accordance with the arc insertion principles described in the preceeding paragraph is illustrated schematically in Figure 6.

Circuit interrupter 100 comprises an upper and lower current carrying studs 101, 102 respectively secured to, and insulated from, frame 103 in a manner well known to the art. Contact arm 104 is pivotally mounted at 105 to lower current carrying stud 102 and is operatively positionable to bridge the gap between the upper and lower current carrying studs 101, 102. Stationary arcing contact 106 and stationary main contact 107 are both secured to upper current carrying stud 101 and are operatively positioned for engagement by movable arcing contact 108 and movable main contact 109 respectively, both mounted to contact arm 104. Movable arcing contact 108 is pivotally secured at 110 to contact arm 104 and is biased in a clockwise direction with respect to Figure 6 so that its operation is effected in the well known blow-open, blow-closed principles employed in conventional circuit breaker construction.

Circuit interrupter 100 further includes arc extinguishing means which comprises arc chute 112 and blow-out coils 143 and 144. Arc chute 112 is of the conventional spaced parallel plate construction and is divided into a forward and a rear section 113 and 114 respectively. A jump gap 115 is disposed adjacent to arcing contact 106. Jump gap 115 as well as blowout coils 143, 144, which are mounted on a continuous magnetic core 111 surrounding arc chute 112, operate in a manner fully described in my U.S. Patent 2,831,946, assigned to the assignee of the instant invention.

Rear arc runner 116 extends upward from jump gap 115 and partially overlaps the left hand end of arc chute 112. Forward arc runner 117 partially overlaps the right hand end of arc chute 112 and is also electrically connected by means of jumper 118 to lower current carrying stud 102. A mid-runner 119 is positioned so as to extend into arc chute 112 from below at the point where the rear 113 and front 114 portions of arc chute 112 are joined. A current limiting resistor 120 is electrically connected by means of insulating conductors 121, 122 to mid-runner 119 and rear arc runner 116 respectively. One terminal of blowout coil 143 is connected to rear arc runner 113 while the other terminal is connected to one terminal of blowout coil 144. The other terminal of blowout coil 144 is connected to the juncture between rear arc runner 116 and jump gap 115.

With circuit interrupter 100 closed, initial clockwise rotation of contact arm 104 will cause an arc to be drawn between arcing contacts 106 and 108. As the arcing lengthens it finds a more attractive path from upper current carrying stud 101 through blow-out coils 143 and 144 to movable arcing contact 108, through contact arm 104 to lower current carrying stud 102. The arc will be further elongated as the distance between arcing contacts 106, 108 increases. During this interval the arc is being driven into the front portion 114 of arc chute 112 by the magnetic field of blow-out coils 143, 144 where it is lengthened and cooled.

When movable arcing contact 108 passes beneath mid-runner 119, or shortly thereafter, resistor 120 will offer a lower impedance than the arc between rear arc runner 116 and movable arcing contact 108 so that the arc current will be transferred to resistor 120. At this time, the current path is from the upper current carrying stud 101 through blow-out coils 113, 114, through current limiting resistor 120 to mid-runner 119 and through an arc drawn between mid-runner 119 and arcing contact 108 as it is positioned to the right of mid-runner 119.

This arc continues to increase in length as contact arm 104 is further rotated clockwise until such time as the arc is transferred from movable contact arm 108 to front arc runner 117. The arc between mid-runner 119 and front arc runner 117 is of reduced current because resistor 120 is connected in series therewith. The magnetic field created by blow-out coils 143, 144 acting in the front portion 113 of arc chute 112 forces the arc to take a torturous path between the plates of front portion 113 thus bringing about a rapid extinction of the arc.

Figure 7:
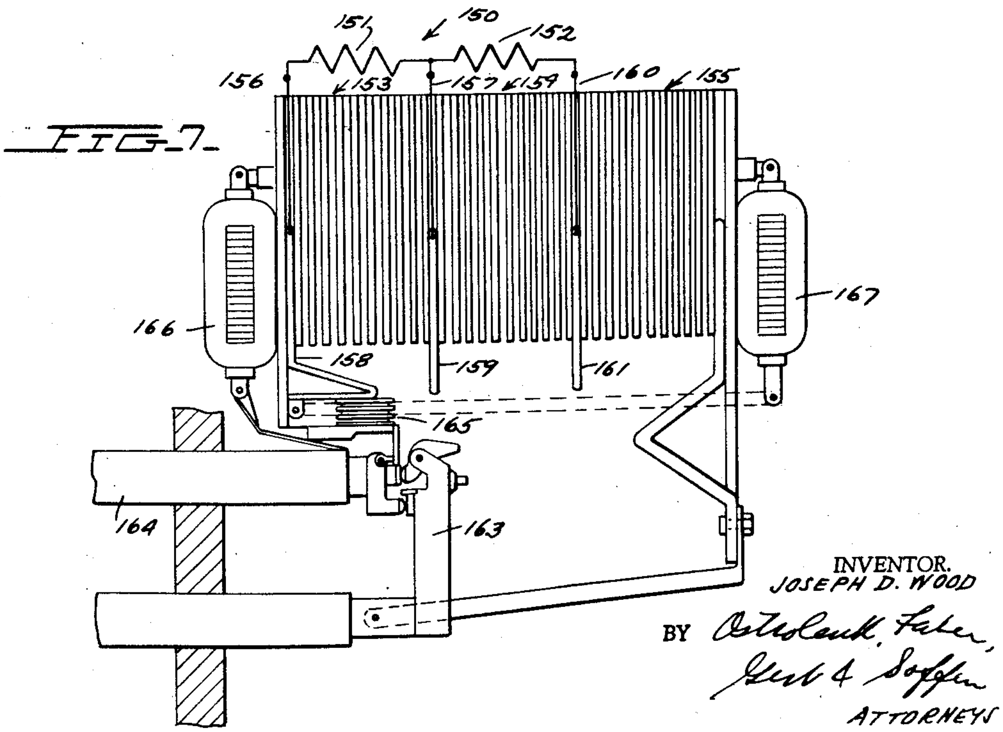
Figure 7 is a schematic illustration of an arc insertion type circuit interrupter wherein the arc is divided into three portions.

Figure 7 schematically illustrates a circuit interrupter 150 which is a modification of circuit interrupter 100. Circuit interrupter 150 is provided with two current limiting resistors 151, 152 and also with an arc chute which is divided into a first, a second and a third section 153, 154, 155 respectively. Resistor 122 is connected in parallel with the first arc chute section 153 by suitable insulating cables 156, 157 which are connected to rear arc runner 158 and mid-runner 159 respectively. Mid-runner 159 is positioned so as to extend into the arc chute from below at the point where sections 153 and 154 are adjacent to one another. The other resistor 152 is connected in electrical parallel with the second section 154 of the arc chute by means of insulating leads 157, 160 which are connected to mid-runners 159 and 161 respectively. Mid-runner 161 extends into the arc chute from below at the point where sections 154, 155 are adjacent to one another. In operating circuit interrupter 150 from its closed to its open position the initial clockwise rotation of contact arm 163 will cause an arc to be drawn between current carrying stud 164 and contact arm 163. The arc lengthens until a portion thereof is extinguished by jump gap 165 after which the arc path is from upper current carrying stud 164 through blow-out coils 166 and 167, through the gap between rear arc runner 158 and contact arm 163. Further opening movement of contact arm 163 will lengthen the arc sufficiently so that the impedance of the arc path exceeds the impedance of resistor 161 and thereafter current will be diverted through resistor 151.

Still further movement of contact arm 163 will cause an arc to be drawn between mid-runner 159 and contact arm 163. The arc current is limited in magnitude to a great extent by the resistance of resistor 151. The arc between mid-runner 159 and contact arm 163 continues to increase in length until such time as the impedance of the arc path exceeds that of resistor 152 at which time the arc current is diverted through the series combination of resistors 151 and 152.

Further movement of contact arm 163 will cause a relatively low current arc to be drawn between mid-runner 161 and contact arm 163. When contact arm 163 reaches an appropriate position the arc will be transferred to rear arc runner 165. Now the low current arc between mid-runner 161 and front arc runner 165 is acted upon by the magnetic field of blow-out coils 166, 167 which drives the arc into the third section 155 of the arc chute where the arc is rapidly distinguished without the danger of restrike. Thus upon circuit interruption the current carrying arc is divided into three portions. The first portion is of a high magnitude and is effectively extinguished in an indvidual section of an arc chute until such time as its magnitude is reduced sufficiently so that it is transferred through a first current limiting resistor. The first current limiting resistor limits the current in the second portion of the arc which is exposed to an uncontaminated section of the arc chute until such time as this portion of the arc finds that it is more attractive to pass the arc current through a second resistor which is in series with the first resistor. The third portion of the arc is limited in magnitude to a reasonable value of current by the series combination of the first and second resistor. Another uncontaminated portion of the arc chute is provided for the extinguishing of the third portion of the arc. The third portion of the arc is readily extinguished since it is of low current and high power factor due to the series combination of current limiting resistors.

Figure 8:
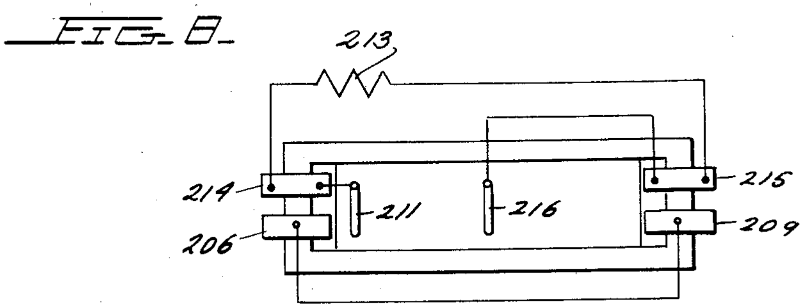
Figure 8 is a side elevation in schematic form of an arc insertion type arc interrupter wherein the number of turns of the blowout coils are increased as the arc current is reduced.
Figure 9:
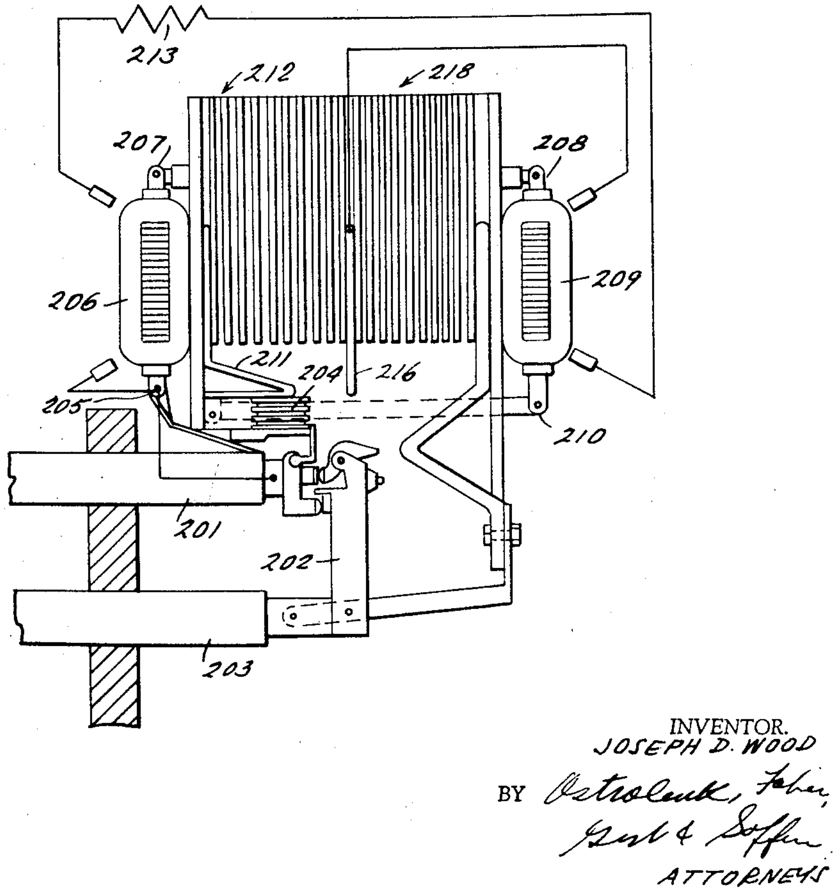
Figure 9 is a plan view of the circuit interrupter of Figure 8.
Figure 10:
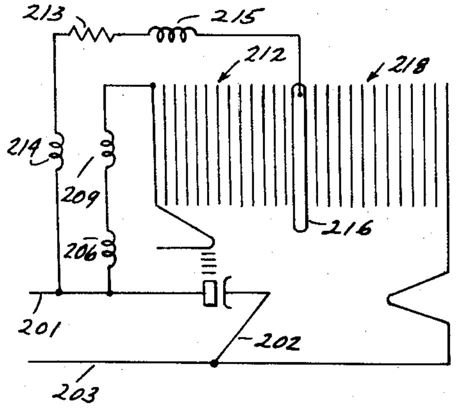
Figure 10 is a schematic of the circuit breaker illustrated in Figures 8 and 9.

Figures 8 and 9 and 10 schematically illustrate a circuit interrupter 200, utilizing the arc insertion principle, which is another modification of circuit interrupter 100 wherein additional coil turns are inserted in series with the current arc simultaneously with the insertion of the current limiting resistor. With circuit interrupter 200 closed the current path comprises upper current carrying stud 201, contact arm 202, to lower current carrying stud 203.

When the arc drawn between contact arm 202 and upper stud 201 jumps gap 204 the current path comprises stud 201, terminal 205 of coil 206, terminal 207 of coil 206 to terminal 208 of coil 209, terminal 210 of coil 209 to rear arc runner 211, the arc gap to contact arm 202 and then through lower stud 203.

When the arc current in the rear section 212 is transferred to current limiting resistor 213 the reduced current also flows through blow-out coils 214 and 215 rather than through blow-out coils 206 and 209. Resistor 213 and coils 214 and 215 are connected in series, and parallel the rear arc chute section 212 being electrically connected to rear arc runner 211 and mid-runner 216.

Blow-out coils 214 and 215 comprise many more turns than blow-out coils 206 and 209. Thus, even though the current of the arc positioned in the front portion 218 of the arc chute is of a low value because of resistor 213, the magnetic force acting on this portion of the arc is quite high since the number of turns of the blow-out coils have been increased.

While the embodiment of Figures 8 and 9 illustrate a construction wherein one set of blow-out coils are substituted for another, it is apparent that all four coils could be connected in series when the arc current is limited by the resistor.

Figure 13:
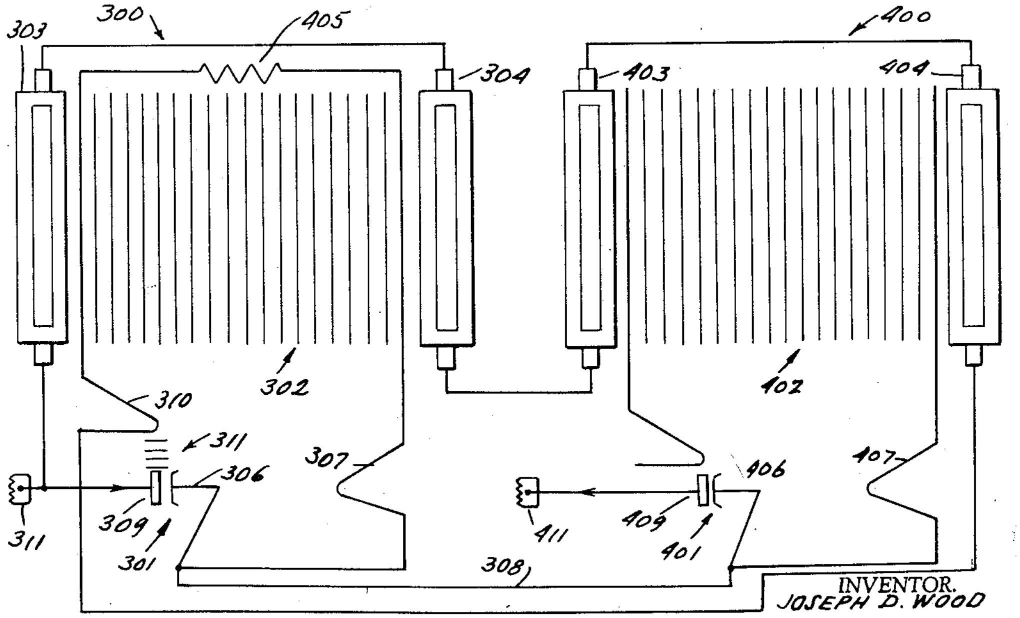
Figures 13 to 15 illustrate various circuit arrangements for the blowout coils and current limiting resistor of the circuit breaker of Figures 10 and 11.
Figure 11:
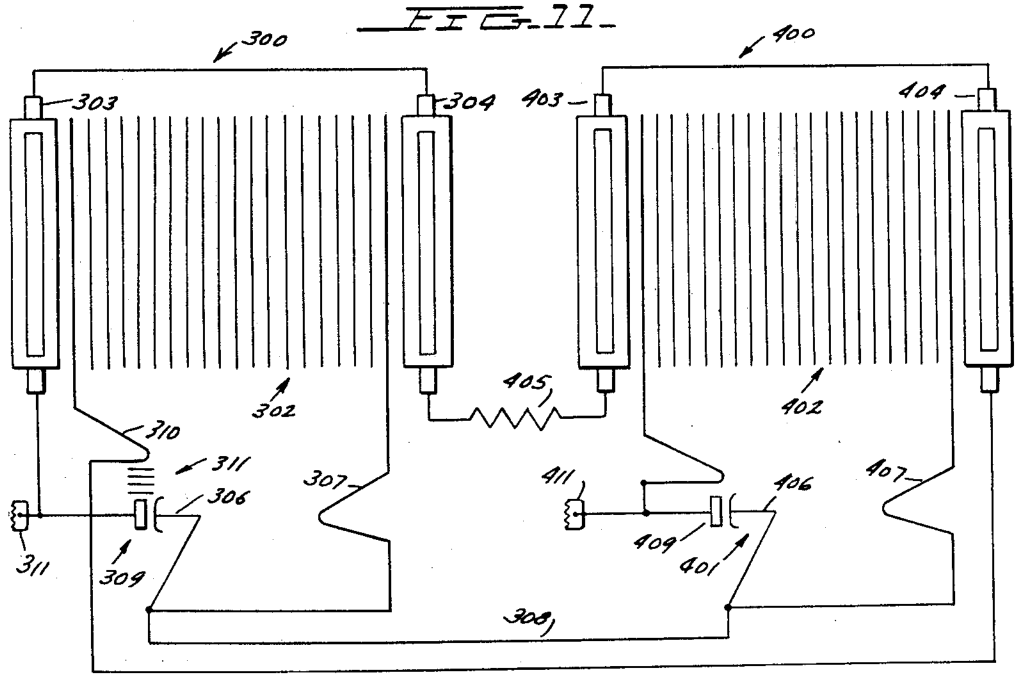
Figure 11 is a schematic of a modification of my invention wherein the circuit breaker is provided with separate arc chutes and a pair of contacts individual to each chute.
Figure 12:
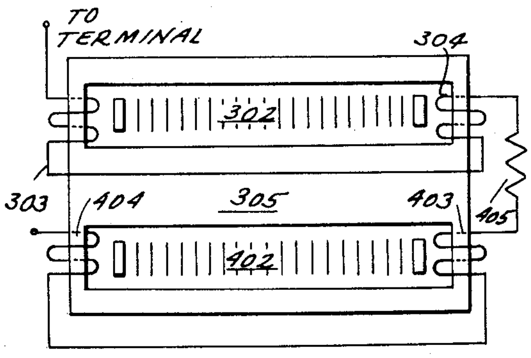
Figure 12 is a plan view of the circuit breaker of Figure 11.

In the circuit interrupters hereinbefore described, each portion of the arc was interrupted in a separate arc chute while in Figures 11 to 13 there are schematically illustrated various arrangements wherein separate arc chutes, each having their own associated set of cooperating contacts, are utilized together with a current limiting resistor.

Now referring more particularly to Figures 11 and 12, the circuit breaker illustrated therein consists of interrupters 300 and 400 comprising cooperating contacts 301 and 401 respectively, associated with arc chutes 302 and 402 respectively. Blowout coils 303, 304 are associated with arc chute 302 while blowout coils 403, 404 are associated with arc chute 402. Coils 303, 304, 403, 404 are wound on a single double-windowed magnetic structure 305 and coils 403, 404 comprise a greater number of turns than coils 303, 304 since the arc current in chute 402 will be less than that in chute 302.

Movable contacts 306, 406 as well as front arc runners 307, 407 are electrically connected by means of tie bar 308. Blowout coils 303, 304, 403, 404 and resistor 405 are connected in electrical series between stationary contact 309, connected to circuit breaker terminal 311, and rear arc runner 310. Stationary contact 409 is tied to circuit breaker terminal 411.

Cooperating contacts 301 and 401 are mechanically coordinated so that contacts 401 part after contacts 301 have parted. This may be accomplished by providing a mechanical linkage or an electrical circuit which, responsive to the position of movable contact 306 on opening, will open the prop latch (not shown) maintaining movable contact 406 engaged with stationary contact 409.

As contacts 301 are parted, an initial arc is drawn directly therebetween. As this arc rises in chute 302, it will by virtue of the voltage across transfer gap jump gap 311 transfer current to the four blowout coils 303, 304, 403, 404 and resistor 405, thence from rear arc runner 310 through the arc to movable contact 306. The transfer of current to this circuit will reduce the magnitude of arc current and improve the power factor. This sets the stage for the parting of contacts 401 with an arc being therebetween. The arc in chute 402 is of reduced current but coils 403, 404 are of sufficient turns to maintain a high flux density in chute 402.

Figure 14:
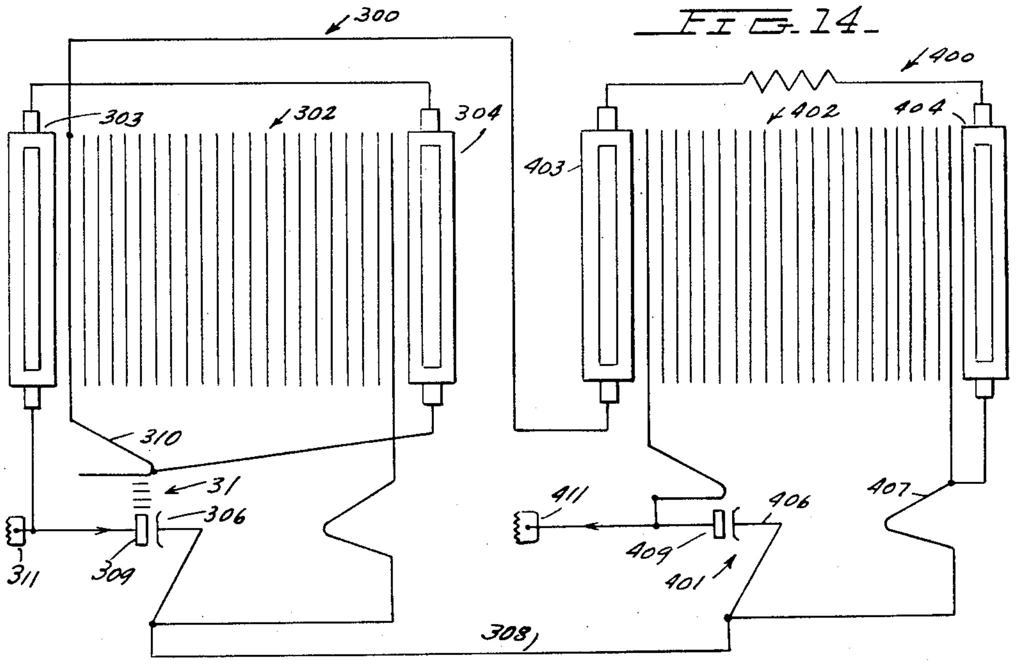
Figure 15:
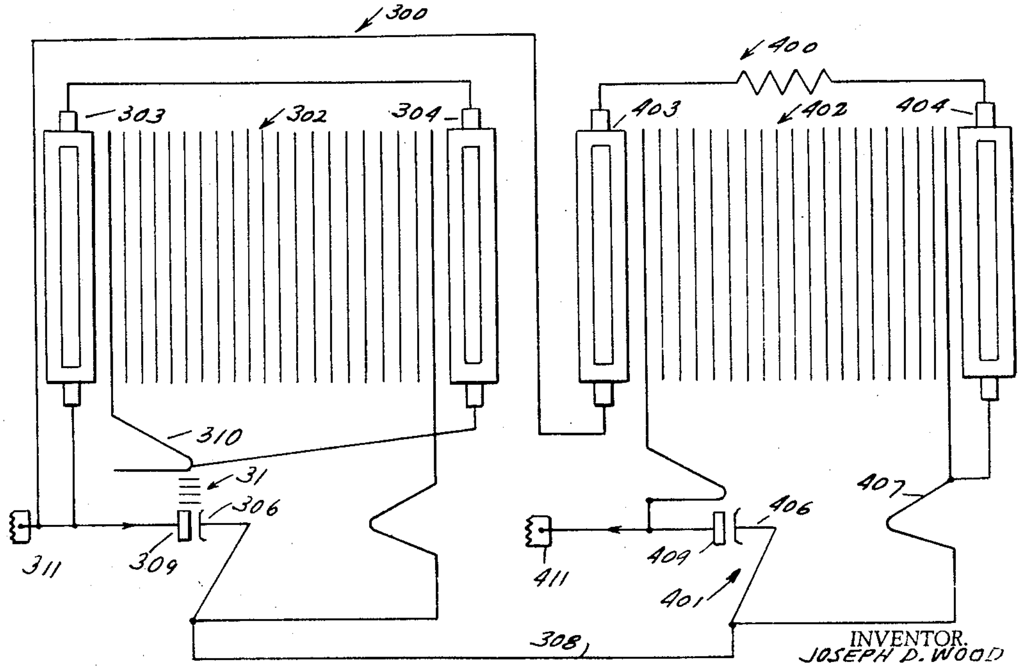

The arc chutes, magnetic structures, and contact structures of Figures 13 to 15 are identical to that of Figure 11, so that the same reference numerals have been retained to designate identical elements. Also, the sequence of contact disengagement remains the same although the timing may be different. However, the arrangements of Figures 13 to 15 differ from that of Figure 11 in the electrical connections of the blowout coils 303, 304, 403, 404 and current limiting resistor 405.

In the variation of Figure 13, resistor 405 is connected directly across arc runners 310 and 307 while coils 303, 304, 403, 404 are connected in electrical series between stationary contact 309 and rear arc runner 310. With resistor 405 connected directly across arc chute 301, this ensures maximum high frequency surge current limitation when energizing capacitor banks while retaining the transfer gap 311 to prohibit high normal frequency momentary currents from passing through the blowout coils during the closing operation.

Parting of contacts 301 in Figure 13 results in an arc being drawn directly thereacross. The arc current is then transferred through blowout coils 303, 304, 403, 404 and flows through an arc between rear runner 310 and movable contact 306. This arc lengthens until such time as the arc is extinguished and its current flows through resistor 405.

At some time before the arc in chute 302 is extinguished, contacts 401 are parted to draw an arc therebetween. The arc current in chute 402 is limited by resistor 405 as soon as the arc of chute 302 is extinguished.

In the variation of Figure 14, coils 303, 304 are energized as soon as the arc drawn by the parting of contacts 301 has jumped transfer gap 311. Coils 403, 404 and resistor 405 are connected between front and rear runners 307, 310 to limit the arc current in chute 402 once the initial arc has been extinguished.

In the variation of Figure 15, coils 303, 304 are energized as soon as the arc in chute 302 has jumped transfer gap 311. At this instant coils 403, 404 and resistor 405 also carry current with these elements being connected in electrical series between fixed contact 309 and movable contact 406. Thus the arc current in interrupter 400 is always limited by the value of resistance 405.

It should be apparent to those skilled in the art that the concept of separate arc chutes, each having a set of cooperating contacts individual thereto, may be expanded to three or more interrupter units. The cooperating contacts are operated in sequence and the blowout coils associated with each succeeding arc chute are provided with a greater number of turns than the blowout coils associated with the preceding arc chute so that the magnetic flux in each chute is maintained at a high level even though the arc current is of a reduced value. Note that a transfer gap is only required for the interrupter in which the initial arc is formed.

Thus I have provided a novel air magnetic circuit interrupter which utilizes the insertion of a low value of resistance in series with the arc to reduce arc current and improve its power factor so as to make arc interruption a relatively simple matter. The arc is formed and extinguished in sections with each section having an individual uncontaminated arc chute associated therewith.

Although I have here described preferred embodiments of my novel invention, many variations and modifications will now be apparent to those skilled in the art, and I therefore prefer to be limited not by the specific disclosure herein, but only by the appended claims.

I claim:

1. An air magnetic circuit interrupter being comprised of a first contact, a movable contact arm, an arc extinguishing means; said contact arm having a second contact mounted thereto and being movable between a first and a second position wherein said second contact is engaged and disengaged respectively from said first contact; said arc extinguishing means including an arc chute comprising a stack of spaced arc plates operatively positioned to receive an arc drawn between said first contact and said second contact when said contact arm is moved from said first to said second position; said arc extinguishing means also including a rear runner positioned at an end of said stack nearest said first contact and a front runner positioned at the other end of said stack; a mid-runner positioned between said front and said rear runners; a current limiting resistor having a first and a second terminal electrically connected to said rear runner and said mid-runner respectively so as to provide a shunt path for a portion of said arc when said arc has lengthened sufficiently to extend between said rear runner and said mid-runner; said contact arm also having a third contact mounted thereon and biased toward engagement with said mid-runner; said third contact being engaged with said mid-runner in a third position of said contact arm intermediate said first and said second positions.

2. An air magnetic circuit interrupter being comprised of a first contact, a movable contact arm, an arc extinguishing means; said contact arm having a second contact mounted thereto and being movable between a first and a second position wherein said second contact is engaged and disengaged respectively from said first contact; said arc extinguishing means including an arc chute comprising a stack of spaced arc plates operatively positioned to receive an arc drawn between said first contact and said second contact when said contact arm is moved from said first to said second position; said arc extinguishing means also including a rear runner positioned at an end of said stack nearest said first contact and a front runner positioned at the other end of said stack; a mid-runner positioned between said front and said rear runners; a current limiting resistor having a first and a second terminal electrically connected to said rear runner and said mid-runner respectively so as to provide a shunt path for a portion of said arc when said arc has lengthened sufficiently to extend between said rear runner and said mid-runner; said contact arm also having a third contact mounted thereon and biased toward engagement with said mid-runner; said third contact being engaged with said mid-runner in a third position of said contact arm intermediate said first and said second positions; said third contact being in engagement with said mid-runner while said contact arm is being moved between its said first and said third positions; disengagement of said first and said second contacts preceding disengagement of said third contact and said mid-runner when said contact arm is being moved from said first to said second position.

3. An air magnetic circuit interrupter being comprised of a first contact, a movable contact arm, an arc extinguishing means; said contact arm being movable between a first and a second position wherein said contact arm is engaged and disengaged respectively from said first contact; said arc extinguishing means including an arc chute comprising a stack of spaced arc plates operatively positioned to receive an arc drawn between said first contact and said contact arm when said contact arm is moved from said first to said second position; said arc extinguishing means also including a rear runner positioned at an end of said stack nearest said first contact and a front runner positioned between said front and said rear runners; a current limiting resistor having a first and a second terminal electrically connected to said rear runner and said mid-runner respectively so as to provide a shunt path for a portion of said arc when said arc has lengthened sufficiently to extend between said rear runner and said mid-runner; said arc extinguishing means further including a first blow-out coil electrically connected between said first contact and said rear runner; said front runner being electrically connected to said contact arm; a second blow-out coil connected in electrical series with said resistor and energized only when said resistor is carrying current therewith increasing the blow-out coil turns when the current of said arc is limited by said resistor.

4. An air magnetic circuit interrupter being comprised of a first contact, a movable contact arm, an arc extinguishing means; said contact arm having a second contact mounted thereto and being movable between a first and a second position wherein said second contact is engaged and disengaged respectively from said first contact; said arc extinguishing means including an arc chute comprising a stack of spaced arc plates operatively positioned to receive an arc drawn between said first contact and said second contact when said contact arm is moved from said first to said second position; said arc extinguishing means also including a rear runner positioned at an end of said stack nearest said first contact and a front runner positioned at the other end of said stack; a mid-runner positioned between said front and said rear runners; said arc extinguishing means including a first and a second blowout coil; said first blowout coil individual to a portion of said stack between said mid-runner and said rear runner; said second blowout coil being individual to a portion of said stack between said mid-runner and said front runner; a current limiting resistor being connected in electrical series with said second blowout coil and the series combination being connected at one end to said rear runner and at the other end to said mid-runner so as to provide a shunt path for a portion of said arc when said arc has lengthened sufficiently to extend between said rear runner and said mid-runner; said contact arm also having a third contact mounted thereon and biased toward engagement with said mid-runner; said third contact being engaged with said mid-runner in a third position of said contact arm intermediate said first and said second positions.

5. An air magnetic circuit interrupter being comprised of a first contact, a movable contact arm, an arc extinguishing means; said contact arm having a second contact mounted thereto and being movable between a first and a second position wherein said second contact is engaged and disengaged respectively from said first contact; said arc extinguishing means including an arc chute comprising a stack of spaced arc plates operatively positioned to receive an arc drawn between said first contact and said second contact when said contact arm is moved from said first to said second position; said arc extinguishing means also including a rear runner positioned at an end of said stack nearest said first contact and a front runner positioned at the other end of said stack; a mid-runner positioned between said front and said rear runners; said arc extinguishing means including a first and a second blowout coil; said first blowout coil individual to a portion of said stack between said mid-runner and said rear runner; said second blowout coil being individual to a portion of said stack between said mid-runner and said front runner; a current limiting resistor being connected in electrical series with said second blowout coil and the series combination being connected at one end to said rear runner and at the other end to said mid-runner so as to provide a shunt path for a portion of said arc when said arc has lengthened sufficiently to extend between said rear runner and said mid-runner; said contact arm also having a third contact mounted thereon and biased toward engagement with said mid-runner; said third contact being engaged with said mid-runner in a third position of said contact arm intermediate said first and said second positions; said second blowout coil comprising a greater number of turns than said first blowout coil.

6. An air magnetic circuit interrupter being comprised of a first contact, a movable contact arm, an arc extinguishing means; said contact arm having a second contact mounted thereto and being movable between a first and a second position wherein said second contact is engaged and disengaged respectively from said first contact; said arc extinguishing means including an arc chute comprising a stack of spaced arc plates operatively positioned to receive an arc drawn between said first contact and said second contact when said contact arm is moved from said first to said second position; said arc extinguishing means also including a rear runner positioned at an end of said stack nearest said first contact and a front runner positioned at the other end of said stack; a mid-runner positioned between said front and said rear runners; said arc extinguishing means including a first and a second blowout coil; said first blowout coil individual to a portion of said stack between said mid-runner and said rear runner; said second blowout coil being individual to a portion of said stack between said mid-runner and said front runner; a current limiting resistor being connected in electrical series with said second blowout coil and the series combination being connected at one end to said rear runner and at the other end to said mid-runner so as to provide a shunt path for a portion of said arc when said arc has lengthened sufficiently to extend between said rear runner and said mid-runner; said contact arm also having a third contact mounted thereon and biased toward engagement with said mid-runner; said third contact being engaged with said mid-runner in a third position of said contact arm intermediate said first and said second positions; said second blowout coil being wound of a conductor having a relatively high electrical resistance; said resistor comprising the resistance of said second blowout coil.

7. An air magnetic circuit breaker comprising a first and a second interrupter each having a pair of cooperating contacts and an arc extinguishing means positioned to receive an electric current arc drawn as their associated pair of contacts are parted; said first interrupter contacts and said second interrupter contacts being operatively connected for sequential operation with the parting of said second contacts following the parting of said first contacts; each of said arc extinguishing means including a parallel plate arc chute and a blowout coil operatively positioned to drive said electric current arc deeply into said chute; said blowout coil of said second interrupter having a greater number of turns than the blowout coil of said first interrupter in order to maintain a high magnetic field in the chute of said second interrupter at reduced currents.

8. An air magnetic circuit breaker comprising a first and a second interrupter each having a pair of cooperating contacts and an arc extinguishing means positioned to receive an electric current arc drawn as their associated pair of contacts are parted; said first itnerrupter contacts and said second interrupter contacts being operatively connected for sequential operation with the parting of said second contacts following the parting of said first contacts; each of said arc extinguishing means including a parallel plate arc chute and a blowout coil operatively positioned to drive said electric current arc deeply into said chute; said blowout coil of said second interrupter having a greater number of turns than the blowout coil of said first interrupter in order to maintain a high magnetic field in the chute of said second interrupter at reduced currents; said cooperating contacts of said first interrupter comprising a first movable and a first stationary contact; said cooperating contacts of said second interrupter comprising a second movable and a second stationary contact; a first terminal directly connected to said first stationary contacts; a second terminal directly connected to said second stationary contact; said first and said second movable contacts being electrically connected directly to one another; a transfer gap positioned between said first stationary contact and a first end of said arc chute of said first interrupter; a resistor operatively connected to limit arc current in the arc chute of said second interrupter.

9. An air magnetic circuit breaker comprising a first and a second interrupter each having a pair of cooperating contacts and an arc extinguishing means positioned to receive an electric current arc drawn as their associated pair of contacts are parted; said first interrupter contacts and said second interrupter contacts being operatively connected for sequential operation with the parting of said second contacts following the parting of said first contacts; each of said arc extinguishing means including a parallel plate arc chute and a blowout coil operatively positioned to drive said electric current arc deeply into said chute; said blowout coil of said second interrupter having a greater number of turns than the blowout coil of said first interrupter in order to maintain a high magnetic field in the chute of said second interrupter at reduced currents; said cooperating contacts of said first interrupter comprising a first movable and a first stationary contact; said cooperating contacts of said second interrupter comprising a second movable and a second stationary contact; a first terminal directly connected to said first stationary contact; a second terminal directly connected to said second stationary contact; said first and said second movable contacts being electrically connected directly to one another; a transfer gap positioned between said first stationary contact and a first end of said arc chute of said first interrupter; a series circuit including a current limiting resistor and said blowout coils of said first and said second interrupters; said series circuit extending from said first stationary contact to said first end of said arc chute of said first interrupter.

10. An air magnetic circuit breaker comprising a first and a second interrupter each having a pair of cooperating contacts and an arc extinguishing means positioned to receive an electric current arc drawn as their associated pair of contacts are parted; said first interrupter contacts and said second interrupter contacts being operatively connected for sequential operation with the parting of said second contacts following the parting of said first contacts; each of said arc extinguishing means including a parallel plate arc chute and a blowout coil operatively positioned to drive said electric current arc deeply into said chute; said blowout coil of said second interrupter having a greater number of turns than the blowout coil of said first interrupter in order to maintain a high magnetic field in the chute of said second interrupter at reduced currents; said cooperating contacts of said first interrupter comprising a first movable and a first stationary contact; said cooperating contacts of said second interrupter comprising a second movable and a second stationary contact; a first terminal directly connected to said first stationary contact; a second terminal directly connected to said second stationary contact; said first and said second movable contacts being electrically connected directly to one another; a transfer gap positioned between said first stationary contact and a first end of said arc chute of said first interrupter; a series circuit including said blowout coils of said first and said second interrupters; said series circuit extending from said first stationary contact to said first end of said arc chute of said first interrupter; a current limiting resistor connected in electrical parallel with said arc chute of said first interrupter.

11. An air magnetic circuit breaker comprising a first and a second interrupter each having a pair of cooperating contacts and an arc extinguishing means positioned to receive an electric current arc drawn as their associated pair of contacts are parted; said first interrupter contacts and said second interrupter contacts being operatively connected for sequential operation with the parting of said second contacts following the parting of said first contacts; each of said arc extinguishing means including a parallel plate arc chute and a blowout coil operatively positioned to drive said electric current arc deeply into said chute; said blowout coil of said second interrupter having a greater number of turns than the blowout coil of said first interrupter in order to maintain a high magnetic field in the chute of said second interrupter at reduced currents; said cooperating contacts of said first interrupter comprising a first movable and a first stationary contact; said cooperating contacts of said second interrupter comprising a second movable and a second stationary contact; a first terminal directly connected to said second stationary contact; said first and said second movable contacts being electrically connected directly to one another; a transfer gap positioned between said first stationary contact and a first end of said arc chute of said first interrupter; said blowout coils of said first interrupter being electrically connected to said first stationary contact and to said first end of said arc chute of said first interrupter; a series circuit including a current limiting resistor and said blowout coil of said second interrupter; said series circuit extending from said first end of said arc chute of said first interrupter to said second movable contact.

12. An air magnetic circuit breaker comprising a first and a second interrupter each having a pair of cooperating contacts and an arc extinguishing means positioned to receive an electric current arc drawn as their associated pair of contacts are parted; said first interrupter contacts and said second interrupter contacts being operatively connected for sequential operation with the parting of said second contacts following the parting of said first contacts; each of said arc extinguishing means including a parallel plate arc chute and a blowout coil operatively positioned to drive said electric current arc deeply into said chute; said blowout coil of said second interrupter having a greater number of turns than the blowout coil of said first interrupter in order to maintain a high magnetic field in the chute of said second interrupter at reduced currents; said cooperating contacts of said first interrupter comprising a first movable and a first stationary contact; said cooperating contacts of said second interrupter comprising a second movable and a second stationary contact; a first terminal directly connected to said first stationary contact; a second terminal directly connected to said second stationary contact; said first and said second movable contacts being electrically connected directly to one another; a transfer gap positioned between said first stationary contact and a first end of said arc chute of said first interrupter; said blowout coils of said first interrupter being electrically connected to said first stationary contact and to said first end of said arc chute of said first interrupter; a series circuit including a current limiting resistor and said blowout coil of said second interrupter; said series circuit extending from said first stationary contact to said second movable contact.

13. An air magnetic circuit breaker comprising a first and a second interrupter each having a pair of cooperating contacts and an arc extinguishing means positioned to receive an electric current arc drawn as their associated pair of contacts are parted; said first interrupter contacts and said second interrupter contacts being operatively connected for sequential operation with the parting of said second contacts following the parting of said first contacts; each of said arc extinguishing means including a parallel plate arc chute and a blowout coil operatively positioned to drive said electric current arc deeply into said chute; said blowout coil of said second interrupter having a greater number of turns than the blowout coil of said first interrupter in order to maintain a high magnetic field in the chute of said second interrupter at reduced currents; said cooperating contacts of said first interrupter comprising a first movable and a first stationary contact; said cooperating contacts of said second interrupter comprising a second movable and a second stationary contact; a first terminal directly connected to said first stationary contact; a second terminal directly connected to said second stationary contact; said first and said second movable contacts being electrically connected directly to one another; a transfer gap positioned between said first stationary contact and a first end of said arc chute of said first interrupter; a resistor operatively connected to limit arc current in the arc chute of said second interrupter; a magnetic structure having a first and a second opening; said arc chutes of said first and said second interrupters being positioned within said first and said second openings respectively.

References Cited in the file of this patent

UNITED STATES PATENTS

| | | |
|---|---|---|
| 1,861,129 | Milliken | May 31, 1932 |
| 2,564,178 | Strobel | Aug. 14, 1951 |
| 2,590,602 | Frink | Mar. 25, 1952 |
| 2,629,798 | Salzer | Feb. 24, 1953 |
| 2,761,933 | Latour | Sept. 4, 1956 |